United States Patent [19]

Cogley, Jr.

[11] 4,072,645

[45] Feb. 7, 1978

[54] TRANSPARENT PRE-CURE COATING FOR RUBBERY POLYMERS

[75] Inventor: Richard J. Cogley, Jr., South Gate, Calif.

[73] Assignee: The Goodyear Tire & Rubber Company, Akron, Ohio

[21] Appl. No.: 706,354

[22] Filed: July 19, 1976

[51] Int. Cl.$^2$ .............................................. C08L 9/10
[52] U.S. Cl. ...................... 260/29.7 M; 260/29.7 SQ
[58] Field of Search ................. 260/29.7 M, 29.7 SQ, 260/23.7 M

[56] References Cited

U.S. PATENT DOCUMENTS

| | | |
|---|---|---|
| Re. 28,957 | 9/1976 | Drelich et al. ................. 260/29.7 M |
| 3,647,704 | 3/1972 | Schrantz ........................ 260/23.7 M |
| 3,687,881 | 8/1972 | Bowman ......................... 260/23.7 M |
| 3,810,852 | 5/1974 | McAlpine et al. ............. 260/29.7 M |
| 3,989,643 | 11/1976 | Aron .............................. 260/23.7 M |

Primary Examiner—M. J. Welsh
Attorney, Agent, or Firm—F. W. Brunner; J. A. Rozmajzl

[57] ABSTRACT

Light-colored unvulcanized polymers such as those used in the white sidewall areas of pneumatic vehicle tires are coated with a carbon black-free, pre-cure paint comprised of a polymer containing hydrated amorphous silica and a zinc activation system in a solubilizable form. The paint may have an aqueous or non-aqueous base; i.e., vehicle.

10 Claims, No Drawings

TRANSPARENT PRE-CURE COATING FOR RUBBERY POLYMERS

This invention relates to transparent pre-cure paints and objects coated therewith.

Pre-cure paints are well known in the art (for example, see U.S. Pat. No. 3,595,950). They serve to form a coating on the unvulcanized surface of a product such as a pneumatic vehicle tire to act as a mold release and to permit flow of rubber at the surface of the product during vulcanization so as to avoid pock mark formation on the surface of the product. Conventionally, such paints contain large amounts of carbon black (up to 800 parts by weight). Normally, such paints have a non-aqueous solvent base. Their use has been limited to dark stocks where the carbon black would have no adverse effect on color.

There is a need for a pre-cure paint which can be used on any type of stock, including light-colored stocks such as the white sidewall portions of pneumatic vehicle tires, as well as the black sidewall area adjacent thereto.

It is an object of the present invention to provide a relatively transparent pre-cure paint which can be used on any colored stock. Other objects will become apparent as the description proceeds.

The objects of the present invention are accomplished by the preparation and use of a carbon black-free, pre-cure paint containing a rubbery diene polymer, a loading amount of hydrated amorphous silica and a zinc activation system in a solubilizable form. The paint may have either an aqueous or non-aqueous base (see U.S. Pat. No. 3,595,950). Any rubbery diene polymer can be used, since all such polymers, when used as thin films, have a high degree of transparency. Such rubbery polymers include copolymers of butadiene and styrene, copolymers of butadiene and acrylonitrile, polybutadiene, polyisoprene and natural rubber.

Since it is preferred that the pre-cure paints be capable of sulfur vulcanization, it is often necessary or desirable that zinc oxide be used as part of the vulcanization system. However, the presence of zinc oxide in large amounts can result in a cloudy gray pre-cure paint film. This gray color does not cause problems when used to coat white or gray areas of a product but can cause discoloration problems when applied to darker areas adjacent to such lighter areas, for example, the black sidewall area of a pneumatic vehicle tire adjacent to the white sidewall area. It is impractical to paint the light-colored area of the tire with one type of pre-cure paint and the adjacent black area with another pre-cure paint. It is also often impractical to lower the amount of zinc oxide or to replace it or to reduce the thickness of the pre-cure paint coating.

The present invention solves the discoloration problem by using zinc in a solubilizable form. This is accomplished by forming a salt or complex of the zinc which is partially or totally soluble in the diene rubber. Another embodiment involves the use of waxes or oils. These waxes or oils can be mixed with the paint or merely applied to the surface of the product prior to or subsequent to the application of the paint. They aid in further solubilizing the zinc salt or complex.

Where a water base paint is used, a polymer latex is compounded with hydrated amorphous silica and either the solubilized form of the zinc or zinc oxide and a compound capable of solubilizing the zinc.

To illustrate, any of the following compounds can be used to at least partially solubilize the zinc.

Ammonium sulfate
Tetra sodium salt of ethylene diamine tetra acetic acid
Triethylene tetra amine
Tetraethylene pentamine
Sodium gluconate
Sodium citrate All of the above compounds were used with zinc oxide to form a solubilized zinc activation system. All were merely added to the polymer latex containing the zinc oxide. The hydrated amorphous silica loaded pre-cure paint formed therefrom was used to paint an unvulcanized product before vulcanization. After vulcanization, each paint film possessed a greater degree of transparency than a film formed using zinc in the non-solubilized form of zinc oxide. The zinc oxide and the solubilizing agent, which is normally a complexing agent, can be combined to form a complex before the addition of either to the latex, or alternatively, can be combined in the latex to react in situ therein to form the complex. If the nature of the complex formation be such, the reaction between the zinc oxide and the solubilizing agent can occur in situ in the diene rubber.

Stearic acid is an example of a solubilizing agent capable of forming a soluble zinc salt (zinc stearate) from the zinc oxide.

None of the solubilized forms of the zinc need to be totally soluble in the polymer. It is only necessary that they be more soluble than the zinc in oxide form. Any degree of solubility will enhance the transparency.

It is extremely important that the film be very thin in order to maintain reasonable transparency. This thickness will naturally vary with the amount of hydrated amorphous silica, and the presence and levels of other ingredients within the pre-cure paint film which would tend to reduce or increase transparency.

It is preferred that a surfactant be added to the latex to improve the wettability of the product surface to prevent "beading up" of the paint on the surface of the painted product. It is also desirable that the pH of the latex be kept on the basic side (for example, 9 to 11) with materials such as sodium carbonate to maintain latex stability. Use of a thickener is also advantageous in that it prevents the paint from running on the surface of the product and also helps to prevent the latex additives from settling out.

A typical, but not limiting, paint recipe is shown below.

| Ingredients | Parts by Weight |
|---|---|
| High styrene SBR latex (30% solids) | 300 |
| Zinc oxide dispersion (50% active) | 6 |
| Antioxidant emulsion (50% active) | 2 |
| Surfactant | 1 |
| Wetting agent (25% aqueous solution) | 2.1 |
| pH stabilizer | 6.5 |
| Ammonium sulfate | 10 |
| Viscosity thickener | 1.6 |
| Lubricating oil | 4 |
| Hydrated amorphous silica | 80 |
| Water | 975 |

The above paint can be used as a pre-cure paint for a white sidewall tire without undue discoloration of the white sidewall area or the black area adjacent thereto.

Any of the standard methods of mixing and applying the paint may be used with the precaution that the hydrated amorphous silica and zinc oxide preferably be ground finely.

A solvent base paint is prepared merely by dissolving a diene polymer in the solvent and adding the ingredients according to standard pre-cure paint techniques.

The hydrated amorphous silica is preferably used in an amount of from 40 to 100 parts per 100 parts by weight of polymer, preferably 60 to 90 parts.

The solubilized zinc is used in an amount sufficient to provide the same amount of zinc provided by 0.5 to 5.0 parts by weight of zinc oxide, preferably 2 to 4 parts.

The solids of the paint can vary, but preferably is from 5 to 15 weight percent where a non-aqueous solvent is used and 10 to 20 percent where water is used.

While certain representative embodiments and details have been shown for the purpose of illustrating the invention, it will be apparent to those skilled in the art that various changes and modifications may be made therein without departing from the spirit or scope of the invention.

What is claimed is:

1. A pre-cure paint comprising:
   a. a rubbery diene polymer,
   b. hydrated amorphous silica,
   c. a zinc salt or zinc complex which is soluble in the rubbery diene polymer, and
   d. a paint vehicle.

2. The paint according to claim 1 wherein the zinc salt or zinc complex is formed in situ in the rubbery diene polymer from zinc oxide.

3. The paint of claim 1 wherein contains sulfur.

4. The paint of claim 3 wherein the zinc salt or complex is formed by a reaction between zinc oxide and a compound selected from the group consisting of ammonium sulfate, the tetrasodium salt of ethylene diamine tetra acetic acid, triethylene tetra amine, tetraethylene pentamine, sodium gluconate and sodium citrate.

5. The paint according to claim 4 wherein the zinc oxide is reacted with ammonium sulfate.

6. A process of preparing the unvulcanized rubbery surface of a product prior to vulcanization of the product, said surface containing light colored portions, comprising coating at least the light color portions of the surface with the precure paint of claim 1.

7. The unvulcanized coated product of claim 6.

8. A process comprising vulcanizing the coated unvulcanized product of claim 7.

9. The vulcanized product of claim 8.

10. The paint according to claim 1, wherein the polymer is in latex form and the vehicle is water.

* * * * *